United States Patent
Rosengren et al.

(10) Patent No.: US 11,925,996 B2
(45) Date of Patent: Mar. 12, 2024

(54) INTEGRATED GUIDE LINEAR ACTUATOR SYSTEM

(71) Applicant: Tolomatic, Inc., Hamel, MN (US)

(72) Inventors: Gary W. Rosengren, Brooklyn Park, MN (US); Wyatt A. Grunerud, Plymouth, MN (US); Ryan H. Bourgoine, Buffalo, MN (US)

(73) Assignee: Tolomatic, Inc., Hamel, MN (US)

( * ) Notice: Subject to any disclaimer, the term of this patent is extended or adjusted under 35 U.S.C. 154(b) by 1000 days.

(21) Appl. No.: 16/200,859

(22) Filed: Nov. 27, 2018

(65) Prior Publication Data
US 2020/0164457 A1  May 28, 2020

(51) Int. Cl.
| | |
|---|---|
| *B23K 11/00* | (2006.01) |
| *B23K 11/31* | (2006.01) |
| *H02K 7/00* | (2006.01) |
| *H02K 7/06* | (2006.01) |
| *F16D 125/00* | (2012.01) |
| *F16D 125/20* | (2012.01) |

(52) U.S. Cl.
CPC .......... *B23K 11/314* (2013.01); *B23K 11/311* (2013.01); *B23K 11/318* (2013.01); *H02K 7/00* (2013.01); *H02K 7/06* (2013.01); *F16D 2125/00* (2013.01); *F16D 2125/20* (2013.01)

(58) Field of Classification Search
CPC ... B23K 11/314; B23K 11/311; B23K 11/318; H02K 7/00; H02K 7/06; F16D 2125/00; F16D 2125/20
See application file for complete search history.

(56) References Cited

U.S. PATENT DOCUMENTS

| | | | |
|---|---|---|---|
| 4,510,565 A | 4/1985 | Dummermuth | |
| 4,841,113 A | 6/1989 | Hamada et al. | |
| 4,859,920 A | 8/1989 | Kurakake et al. | |
| 4,878,002 A | 10/1989 | Heatzig et al. | |
| 4,879,644 A | 11/1989 | Gottshall | |
| 4,908,556 A | 3/1990 | Daggett et al. | |
| 4,962,338 A | 10/1990 | Daggett et al. | |

(Continued)

FOREIGN PATENT DOCUMENTS

| | | |
|---|---|---|
| CA | 2578889 A1 | 8/2007 |
| DE | 0726118 A1 * | 2/1995 |

(Continued)

OTHER PUBLICATIONS

Series LC Single Rod Escapements (catalog). PHD, Inc., Jul. 11, 2012, Retrieved Jun. 26, 2014 from <http://litstore.phdinc.com/documentDesc.asp?catId=86>.

(Continued)

*Primary Examiner* — Zakaria Elahmadi
(74) *Attorney, Agent, or Firm* — Dorsey & Whitney LLP

(57) ABSTRACT

An apparatus or actuator system having a motor, a housing and a thrust rod or thrust tube, where the actuator is configured to convert rotational motion of the motor into axial motion of the thrust tube for axial motion of a tool coupling therewith. A guide assembly is coupled to the actuator housing, extending along an axis thereof. The guide assembly comprises a guide shaft and a coupling between the guide shaft and the thrust tube, and is configured to provide positional stability for the tool coupling when positioned along the actuator axis by motion of the thrust tube.

25 Claims, 6 Drawing Sheets

(56) References Cited

U.S. PATENT DOCUMENTS

| | | | |
|---|---|---|---|
| 5,099,161 | A | 3/1992 | Wolfbauer |
| 5,241,250 | A | 8/1993 | Nagasawa et al. |
| 5,463,296 | A | 10/1995 | Fugere et al. |
| 5,557,154 | A | 9/1996 | Erhart |
| 5,931,047 | A | 8/1999 | Ellqvist et al. |
| RE36,631 | E | 3/2000 | Tanabe et al. |
| 6,067,868 | A | 5/2000 | Nakamura et al. |
| 6,072,145 | A | 6/2000 | Suita et al. |
| 6,124,693 | A | 9/2000 | Okanda et al. |
| 6,188,190 | B1 | 2/2001 | Arakawa |
| 6,469,272 | B2 | 10/2002 | Dugas et al. |
| 6,588,289 | B2 | 7/2003 | Ung et al. |
| 6,603,228 | B1 | 8/2003 | Sato |
| 6,828,522 | B2 | 12/2004 | Hochhalter et al. |
| 6,870,121 | B2 * | 3/2005 | Beauregard .......... B23K 11/317 219/86.25 |
| 7,541,707 | B2 | 6/2009 | Hochhalter et al. |
| 8,978,497 | B2 | 3/2015 | Bourgoine et al. |
| 9,334,936 | B2 | 5/2016 | Rosengren et al. |
| 9,431,868 | B2 | 8/2016 | Rosengren et al. |
| 9,676,067 | B2 | 6/2017 | Ryu |
| 9,816,592 | B1 * | 11/2017 | Glikin ................ F16H 25/2021 |
| 10,907,722 | B2 * | 2/2021 | Besser ................ F16H 25/2015 |
| 11,092,219 | B2 * | 8/2021 | Lee .................... F16H 25/2209 |
| 2003/0196502 | A1 | 10/2003 | Sato et al. |
| 2005/0109139 | A1 | 5/2005 | Nagai et al. |
| 2005/0132830 | A1 | 6/2005 | Gerbier et al. |
| 2005/0212363 | A1 | 9/2005 | Okubo |
| 2008/0196521 | A1 | 8/2008 | Chiang |
| 2008/0272093 | A1 | 11/2008 | Sato |
| 2009/0140586 | A1 * | 6/2009 | Fukano ................. F16H 25/20 310/83 |
| 2009/0239095 | A1 | 9/2009 | Desai et al. |
| 2011/0113955 | A1 * | 5/2011 | Fukano ................ H02K 7/116 92/172 |
| 2012/0001499 | A1 | 1/2012 | Makino et al. |
| 2012/0043832 | A1 | 2/2012 | Neff et al. |
| 2013/0285494 | A1 | 10/2013 | Iversen et al. |

FOREIGN PATENT DOCUMENTS

| | | | |
|---|---|---|---|
| DE | 102010051061 A1 | 5/2011 | |
| DE | 102012100387 A1 | 7/2012 | |
| DK | 102010051061 A1 | 5/2011 | |
| DK | 102012100387 A1 | 7/2012 | |
| EP | 0209604 A1 | 1/1987 | |
| EP | 0726118 A1 * | 2/1996 | ............... B23Q 5/40 |
| EP | 1782909 A1 | 5/2007 | |
| JP | 2005172234 A | 6/2005 | |
| WO | 0101209 A1 | 1/2001 | |
| WO | 2017048788 A1 | 3/2017 | |

OTHER PUBLICATIONS

International Search Report and Written Opinion dated Mar. 26, 2020 in connection with international patent application No. PCT/US2019/060033, 12 pages.

PHD Litstore "Product Packers: 6441-264 Series LC Escapement Information Sheet, CAT-6441264" accessed Oct. 6, 2015 at <http://litstore.phdinc.com/documentDesc.asp?catID=68>, 6 pages.

Series LC Single Rod Escapements (catalog). PHD, Inc., Jul. 11, 2012, Retrieved Jun. 26, 2014 from <http://litstore.phdinc.com/documentDesc.asp?catId=86>. Jul. 11, 2012.

Inconel alloy 600 (product literature), Special Metals Corporation, Sep. 2008. Retrieved Jun. 26, 2014 from <http://www.specialmetals.com>, Sep. 1, 2008.

Lassner, E. et al., Lassner, E. et al., "Tungsten: Properties, Chemistry, Technology of the Element, Alloys, and Chemical Compounds." New York: Kluwer Academic/Plenum Publishers, 1998, ISBN 0-306-45053-4, p. 18., Jan. 1, 1998.

* cited by examiner

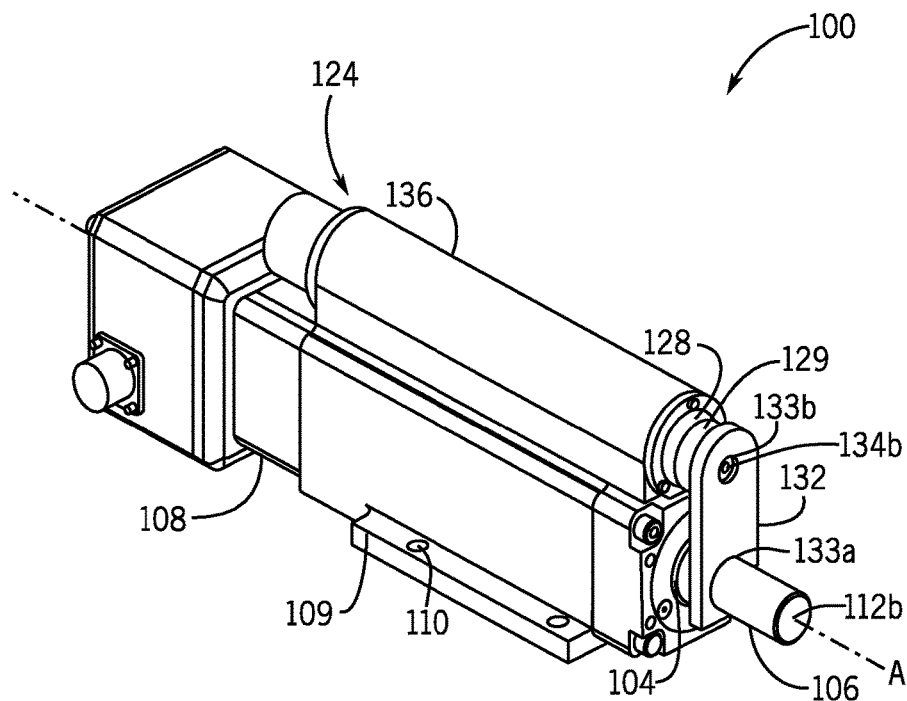
FIG. 4
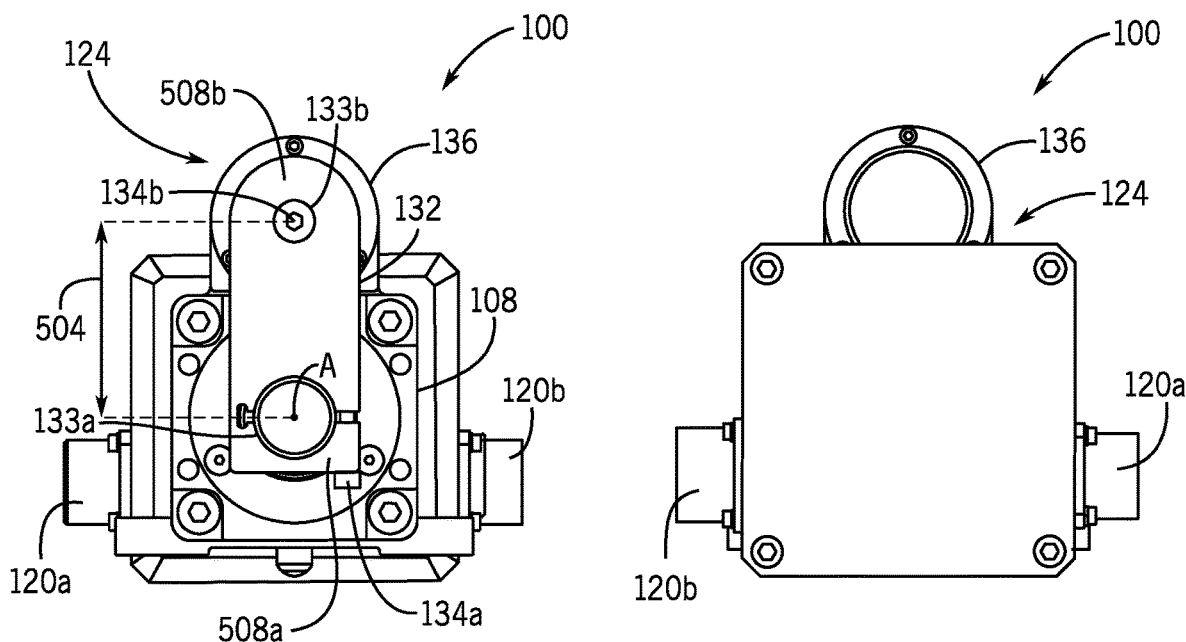
FIG. 5A
FIG. 5B

INTEGRATED GUIDE LINEAR ACTUATOR SYSTEM

BACKGROUND

This application relates to linear actuators for use in automated machine tool systems, including robotic welding and other programmable tool applications. More generally, the disclosure relates to the thrust-bearing elements of a linear actuator system, including thrust tube and thrust rod components.

Industrial robots utilize a wide variety of different actuator technologies, in order to automate manufacturing processes including robotic welding, injection molding, fixture clamping, packaging, assembly, surface coating, and product inspection and testing. Other high-volume and precision production manufacturing applications are also encompassed, where machine tool speed, accuracy, endurance, service life and operational costs are important engineering factors.

In robotic welding and automated or programming machine tool applications, robotic actuators can be arranged to position a welding gun or other apparatus with respect to a workpiece, using a linear actuator to position an electrode or end effector. Suitable applications include, but are not limited to, short-stroke clamping operations for arc, spot, or resistance welding, projection welding and friction stir welding. Linear actuators are also used in a range of other programmable tool applications, including robotic, pedestal, and fixture-type manufacturing operations.

Actuator speed, precision, and service life remain important design factors across these different applications, along with system size and weight considerations. As a result, there is a continuing need for improved linear actuator designs which can provide increased positioning accuracy with reduced actuator deflection and tool displacement without unduly increasing total tooling size, weight, and cost.

SUMMARY

This application is directed to actuator systems, including, but not limited to, linear actuators for use in robotic welders and other programmable mechanical tools. Representative systems include features that facilitate positional stability of a thrust tube of the actuator.

In an embodiment, a linear actuator system is disclosed. The linear actuator includes an actuator housing. The linear actuator further includes a thrust tube extending from a proximal end disposed at least partially within the actuator housing to a distal end disposed at least partially outside the housing. The linear actuator further includes a motor configured to move the thrust tube in a reciprocating motion along a longitudinal axis thereof. The linear actuator further includes a guide assembly connected to the actuator housing. The guide assembly includes a guide shaft configured for coordinated reciprocating motion with the thrust tube, adjacent the longitudinal axis. The linear actuator includes a bridge coupling between the guide shaft and the thrust tube. The guide shaft and bridge coupling are configured to provide positional stability to the distal end of the thrust tube, in the reciprocating motion along the longitudinal axis.

In another embodiment, a method is disclosed. The method is directed to stabilizing a thrust tube. The method includes supporting the thrust tube at least partially within an actuator housing. The thrust tube extends from a proximal end within the actuator housing to a distal end selectively positionable exterior to the actuator housing. The method further includes moving the thrust tube between a first, retracted position with the distal end proximate the actuator housing and a second extended position with the distal end spaced from the actuator housing. The distal end of the thrust tube is subject to loading in the second extended position. The method further includes providing positional stability to the distal end of the thrust tube when subject to the loading with a guide assembly positioned adjacent the thrust tube. The guide assembly includes a guide shaft moveable with the thrust tube and a bridge coupling between the guide shaft and the distal end of the thrust tube.

In another embodiment, an apparatus is disclosed. The apparatus includes features directed to stabilizing an actuator thrust tube. The apparatus includes an actuator having a thrust tube configured for reciprocating motion along a longitudinal axis. The thrust tube has a distal end configured for coupling to a machine tool. The apparatus further includes a guide shaft disposed offset from the longitudinal axis and oriented substantially parallel to the thrust tube. The apparatus further includes a bridge coupling between the thrust tube and the guide shaft at the distal end. The bridge coupling is configured to move the guide shaft with the reciprocating motion of the thrust tube. The bridge coupling and the guide shaft cooperate to limit off-axis deflection of the distal end of the thrust tube during the reciprocating motion.

In addition to the exemplary embodiments described above, further embodiments will become apparent by reference to the drawings and by study of the following description.

BRIEF DESCRIPTION OF THE DRAWINGS

FIG. 4 is an isometric view of the actuator system.

FIG. 5A is a front view of the actuator system, showing the bridge coupling between the guide rod and thrust tube.

FIG. 5B is a rear view of the actuator system and guide rod assembly.

Figure 1:
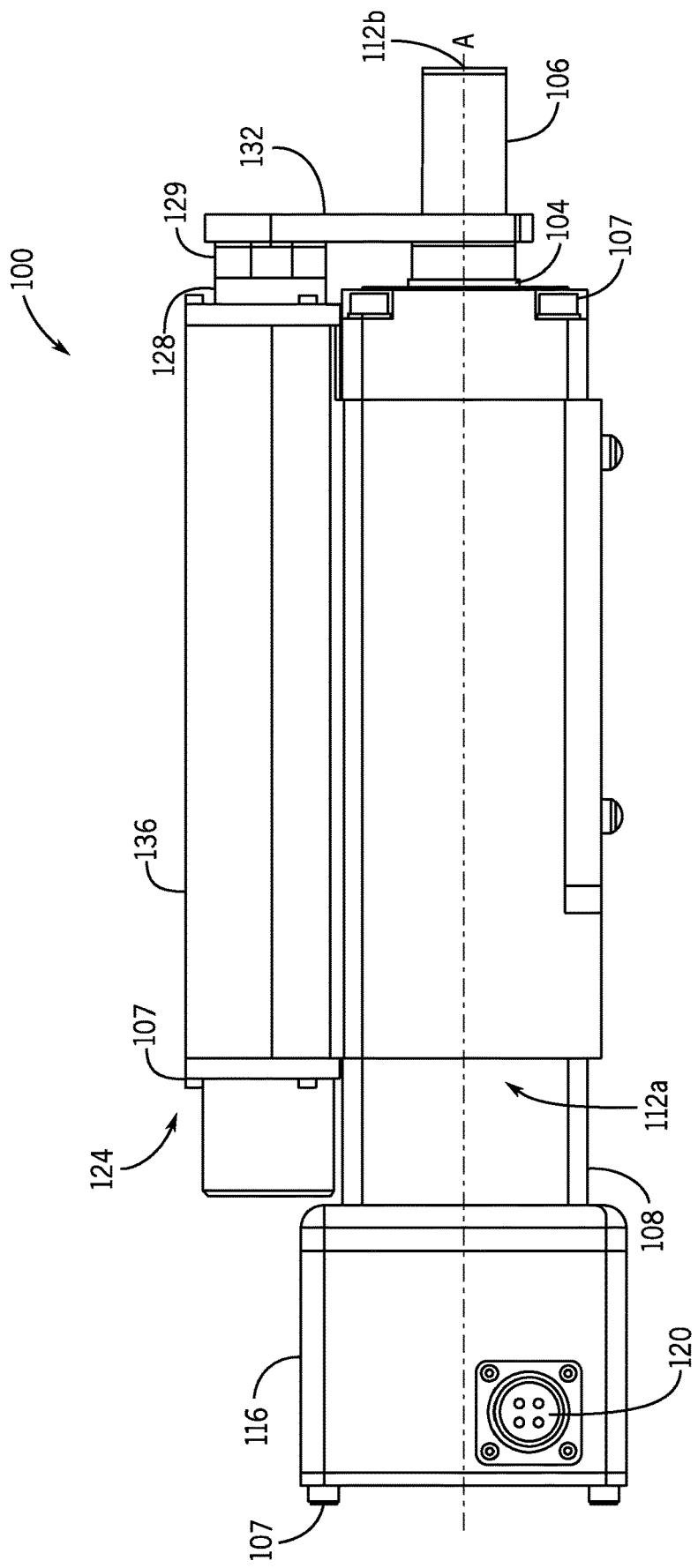
FIG. 1 is a side elevation view of a linear actuator system with integrated guide assembly.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

The proportions and dimensions (either relative or absolute) of the disclosed features and elements (and collections and groupings thereof), and the boundaries, separations, and positional relationships therebetween are provided in the accompanying figures to facilitate an understanding of the various embodiments described herein, and may not necessarily be presented or illustrated to scale. Nor are these representations intended to indicate any preference or requirement for any illustrated embodiment, to the exclusion of other embodiments described with reference thereto.

DETAILED DESCRIPTION

This disclosure relates to an integrated guide assembly for a linear actuator and linear actuator systems using the guide assembly. Representative base technologies include, but are not limited to, electric-motor-driven linear actuator systems as described in U.S. Pat. No. 7,541,707, "Electric Actuator," issued Jun. 2, 2009; U.S. Pat. No. 8,978,497, "Linear Actuator with Anti-rotation Mechanism," issued Mar. 17, 2015; U.S. Pat. No. 9,334,936, "High Stiffness Thrust Component for Linear Actuator," issued May 10, 2016; and U.S. Pat. No. 9,431,868, "Manual Override Device for an Electric Actuator and Method for Use," issued Aug. 30, 2016, each of which is incorporated by reference herein, in the entirety and for all purposes.

This disclosure also relates to linear actuator technologies for use in automated or programmable machine tool systems, including resistance welding of steel, aluminum, and other metal components. Applications include, but are not limited to, auto manufacturing and other welding applications. More generally, the application relates to any actuator system where improved speed, accuracy, reliability, and operational stability are desired, including other programmable machine tool systems, such as those related to clamping, crimping, and/or other manufacturing processes.

Broadly, the linear actuator systems described herein include thrust tubes that are configured for reciprocating motion along a longitudinal axis. A machine tool is positionable at a distal end of the thrust tube, and as such, the reciprocating motion of the thrust tube can drive the machine tool correspondingly. The machine tool is selectively positionable in this manner. This may be beneficial, for example, in an automated manufacturing setting where a machine tool is advanced toward a workpiece to perform a machine operation (e.g., welding) and subsequently moved away from the workpiece when complete. The machine tool is subject to loading, including off-axis forces associated with mechanical loads and/or current loads, which can deviate the machine tool from a target position.

The linear actuator systems and techniques described herein can mitigate such hindrances, thereby enhancing the positional stability of the machine tool. In one embodiment, a guide assembly is used to provide positional stability to a thrust tube of the linear actuator. The guide assembly helps stabilize the reciprocating motion of the thrust tube along the longitudinal axis. The stabilized thrust tube can help a machine tool coupled to the thrust tube (e.g., at a distal end) advance to a target position. For example, the thrust tube is subjected to off-axis forces that bias the thrust tube away from the longitudinal axis. In turn, the guide assembly can effectively enhance the stiffness of the thrust tube at the distal end, and this limits deflection of the thrust tube due to the off-axis forces.

To facilitate the foregoing, the guide assembly includes a moveable component, such as a guide shaft, that is adjacent the longitudinal axis of the thrust tube. The guide shaft is generally arranged substantially parallel with and over the thrust tube. This facilitates a compact footprint of the actuator system and shields the guide shaft from debris. A bridge coupling or other linking feature is positioned between the guide shaft and the thrust tube. The bridge coupling defines a substantially rigid connection between the thrust tube and the guide shaft and moves the guide shaft with the reciprocating movements of the thrust tube. Each of the guide shaft and the thrust tube are radially constrained, for example, by a housing or other features of the actuator.

The guide shaft and the bridge coupling can cooperate to limit off-axis travel of the thrust tube. Rather than depend solely on material properties of the thrust tube (e.g., stiffness) and/or radial constraint within a housing, the thrust tube benefits from the radially constrained guide shaft, connected to the thrust tube via the bridge coupling. Off-axis forces received at the thrust tube encounter resistance from the radially constrained guide shaft. And as such, the distal end of the thrust tube exhibits a greater resistance to deflection. In light of the greater resistance to deflection, the linear actuator can enhance repeatable and reliable driving action of a machine tool toward a target position, even where mechanical and current loads induce off-axis forces.

The distal end of the thrust tube and machine tool may experience a variety of loads and loading conditions. In some cases, the loading may result from welding operations associated with the machine tool. While a number of techniques are used to weld steel, aluminum, and other metal components, resistance welding is often favored based on speed and cost considerations, which in turn can increase overall production throughput and manufacturing efficiency.

Generally, resistance welding is performed by passing an electrical current through two or more metal components which are clamped between electrodes for the welding process. Significant levels of current may be required to produce acceptable welds in aluminum and other conductive metals, depending on part size, metal conductivity, heat capacity, and other electrical, thermodynamic and material property considerations. There may also be substantial mechanical loading on the weld electrodes in order to provide the mechanical coupling required to ensure high quality welds. The greater the mechanical loading and weld current, the greater the potential for displacement of the weld electrode. The reaction forces can cause the welding gun and actuator assembly to deflect off axis, causing the electrodes to slip or skid out of the desired position and hampering the ability to produce acceptable welds.

The guide assembly of the present disclosure helps mitigate such slipping or skidding of the electrodes from the desired position. More generally, the guide assembly can mitigate slipping, skidding, or other deviations from a target position for any of a variety of machine tools. In this regard, it will be appreciated that other operations, including operations of other machine tools (including crimping- and clamping-type machine tools), may induce loads on the thrust tube. Accordingly, to the extent that welding-type machine tools are described herein, this is for purposes of illustration and is not limiting the actuator systems and techniques to welding systems. Rather, the guide assembly and associated components may be used to enhance the positional stability of the actuator thrust tube for any of a variety of machine tools and automated manufacturing settings, as descried herein.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, skill, and knowledge of the relevant art are within the scope of the present inventive aspects.

FIG. 1 depicts a linear actuator system 100, such as the linear actuator system discussed above and described in greater detail below. The linear actuator system 100 is used to drive a thrust tube or output rod 104 in reciprocating motion along a longitudinal axis A. In the configuration shown in FIG. 1, the thrust tube 104 is positioned at least partially within an actuator housing 108. The thrust tube 104 generally extends along the longitudinal axis A from a proximal end 112a (within the actuator housing 108) to a distal end 112b positioned outside of the housing 108, defining an output end of the thrust tube 104. A motor assembly, described in greater detail below, is positioned within the actuator housing 108 and configured to move the thrust tube 104 in reciprocating motion along the longitudinal axis A. The thrust tube 104 generally moves from a first retracted position (shown in FIG. 1) to a second extended position, in which the thrust tube 104 advances at least partially outside of the actuator housing 108. This reciprocating motion between the first retracted position and the second extended position can be used to drive a machine tool in a corresponding fashion along the longitudinal axis A.

As used herein, the terms "proximal" and "distal" are defined with respect to the internal components of the linear actuator system 100, and the workpiece or tool coupling 106, located on the output end of the thrust tube 104, outside of the actuator housing 108. In particular, the term distal refers to the direction of the coupling 106 (and any workpiece or tooling component connected thereto), and the term proximal refers to the direction away from the coupling 106 (and any connected workpiece or tool). Alternatively, the terms may be interchanged without loss of generality, depending on design or drawing convention.

A machine tool can be moved by the linear actuator system 100 using the coupling 106. The coupling 106 is connected to the thrust tube 104 at or adjacent the distal end 112b. The coupling 106 defines an interface or other structure that allows the thrust tube 104 (and linear actuator system 100 more generally) to engage a machine tool. The substantially cylindrical contour of the coupling 106 shown in FIG. 1 may additionally include a variety of engagement features, including pins, clamps, screws, grooves, locking mechanisms, and so forth, that are used to secure a machine tool to the coupling 106. With a machine tool secured to the coupling 106, the machine tool may move with reciprocating movements of the thrust tube 104.

The actuator housing 108 shown in FIG. 1 generally encloses a portion of the thrust tube 104. The actuator housing 108 further encloses a motor assembly and any other appropriate components that are used to facilitate the reciprocating motion of the thrust tube 104. Exemplary components are described in greater detail with respect to FIG. 2, and include motor assembly components (e.g., magnets, windings, rotors), bushings, bearings, components for converting rotational motion into reciprocating motion, and so on. The actuator housing 108 may be formed by extruding a generally hollow shape configured to enclose such components. In other cases, the actuator housing 108 may be a multi-piece assembly.

The actuator housing 108 is shown in FIG. 1 as having a control housing (or housing portion) 116. The control housing 116 is positioned along the longitudinal axis A and adjacent the proximal end of the housing 108. As described herein, the linear actuator system 100 generally converts rotational motion (e.g., of an internal screw) into reciprocating motion of the thrust tube 104. The control housing 116 can enclose various components that facilitate precision control of the reciprocating motion, such as a rotary encoder that detects a rotational position of the internal screw and/or other control components or logic that uses the detected position to determine a reciprocated position of the thrust tube 104.

An external connection or similar connector 120 is positioned at or on the control housing 116. The connection 120 is used to connect the linear actuator system 100 to various external systems and processes. For example, the connection 120 can be used to electrically connect the linear actuator system 100 to a power source. Additionally or alternatively, the connector 120 can be used to provide a data connection between the linear actuator system 100 and an external computing device, which may facilitate control of one or more operations of the linear actuator system 100.

It will be appreciated that the connector 120 is shown for purposes of illustration. While the connector 120 may be used to provide a connection or link between the linear actuator system 100 and an external power supply, computing device, and/or other system, in other cases, other features can be used to facilitate such connection. As one example, a remote computing device may be wirelessly coupled with one or more internal components of the linear actuator system 100. As such, control signals and/or data outputs can be exchanged between the remote computing device and the linear actuator system 100 by wireless connection, according to various protocols.

In operation, the linear actuator system 100 is subject to various loading conditions. This can include off-axis forces induced by mechanical and/or current loads associated with an operation of a machine tool. Machine tools are connected to the linear actuator system 100 via the coupling 106, which is positioned at the distal end 112b. Such off-axis forces can bias the distal end 112b of the thrust tube 104 and coupling 106 away from the longitudinal axis A. To the extent that the coupling 106 and the machine tool move away from the longitudinal axis, the effectiveness and reliability of the machine tool may be reduced.

FIG. 1 shows the linear actuator system 100 having a guide assembly 124. The guide assembly 124 operates to enhance the positional stability of the thrust tube 104. In this manner, the guide assembly 124 may mitigate or restrain deflection of the coupling 106 away from the longitudinal axis A in response to off-axis forces, and thereby enhance the positional stability of the machine tool.

To facilitate the foregoing, the guide assembly 124 is shown as having a guide shaft 128. The guide shaft 128 is positioned at least partially within a guide housing (or housing section) 136 of the guide assembly 124, and configured for reciprocating movement with the thrust tube 104 along longitudinal axis A. For example, a suitable guide shaft 128 can be disposed adjacent to and alongside the thrust tube 104 as shown, reciprocating with the thrust tube 104 along the direction of longitudinal axis A.

Positioned between the guide shaft 128 and the thrust tube 104 is a bridge coupling 132. The bridge coupling 132 defines a substantially rigid connection between the guide shaft 128 and the thrust tube 104. In certain embodiments, such as that shown in FIG. 1, a fitting 129 connects the distal ends of the guide shaft 128 and bridge coupling 132. The bridge coupling 132 extends transversely to longitudinal axis A, between a first end or first portion fixed to the coupling 106 (or other distal end structure) of the thrust tube 104, and a second end or second portion fixed to the fitting 129 (or other distal end structure) of the guide shaft 128.

In this arrangement, the thrust tube 104, guide shaft 128 and bridge coupling 132 reciprocate together along the direction of longitudinal axis A, in an adjacent and laterally spaced arrangement. Alternatively, the first end or portion of the bridge coupling 132 can be engaged with the guide shaft 128 in a sliding or other transverse load-bearing relationship, with the opposite end fixed to the coupling 106 on the distal end of the thrust tube 104. In this arrangement, the bridge coupling 132 reciprocates along with thrust tube 104, while the guide shaft 128 may be fixed, with the bridge coupling 132 reciprocating along a selected length thereof.

Each of the thrust tube 104 and the guide shaft 128 are radially constrained within a housing. The thrust tube 104 is radially constrained within the actuator housing 108 and the guide shaft 128 is radially constrained within the guide housing 136. The guide housing 136 is shown in FIG. 1 as positioned above and parallel with the actuator housing 108. In this manner, the guide housing 136, and guide assembly 124 more generally, is within a footprint of the actuator housing 108. This may help confine a center of gravity of the linear actuator system 100 to within a footprint of the actuator housing 108, notwithstanding a reciprocated position of the thrust tube 104.

While the guide housing 136 and the actuator housing 108 are shown for purposes of illustration as separate housing portions or components, it will be appreciated that the guide housing 136 and the actuator housing 108 may be formed as a unitary structure that defines an integrated housing component. For example, an integral, extruded or co-extruded housing structure comprising the actuator housing 108 and guide housing 136 may be formed with a channel or aperture adapted for receiving the guide shaft 128 and other components of the guide assembly 124, and an adjacent channel or aperture adapted for receiving the thrust tube 104 and associated components of the linear actuator system 100. A suitable unitary actuator housing component can also be machined and the like to include an actuator housing section 108 to accommodate components of the linear actuator system 100, such as the motor assembly, bearings, thrust tube, bushings, and so on, as described herein, with an integral guide housing section 136 to accommodate the guide shaft 128 and other components of the guide assembly 124. The unitary housing component 108 may be extruded or machined to a selected size, and cut, shaped and contoured to accommodate a given stroke length of the thrust tube 104 and guide shaft 128.

The guide housing 136 and the actuator housing 108 may also be separately formed or machined as distinct housing components. When independently machined or otherwise formed separately, the guide housing 136 and the actuator housing 108 can be joined to one another by a variety of suitable techniques, including, but not limited to, being bolted, welded, or joined in another mechanical fashion. In either the unitary or separately formed housing case, the linear actuator system 100 may include suitable mechanical couplings 107 or other fasteners such as bolts, screws, threaded rods and the like that couple portions of the actuator system housing to one another, for example to couple the actuator housing portion 108 to the control housing portion 116 and the guide housing portion 136, to couple the assembly housing 108 to a robot or machine tool component, or to reinforce the assembled housing structure.

In operation, the bridge coupling 132 is used to cause movement of the guide shaft 128 with the reciprocating movement of the thrust tube 104. The thrust tube 104 is driven in reciprocating motion along the longitudinal axis A. The bridge coupling 132 defines a portion of a rigid connection between the thrust tube 104 and the guide shaft 128. The guide shaft 128 floats or is otherwise substantially unrestrained along its longitudinal axis by the guide housing 136. Accordingly, the reciprocating movements of the thrust tube 104 along the longitudinal axis A move the bridge coupling 132 in corresponding motion adjacent the axis A, which in turn couples to the guide shaft 128 to cause reciprocating movement of the guide shaft 128. The reciprocating movement of the guide shaft 128 is generally substantially parallel to, and offset from, the longitudinal axis A, along which the thrust tube 104 moves.

In addition to movement along the longitudinal axis A, the thrust tube 104 may be biased or caused to move or deflect at least partially away from the longitudinal axis A. As one example, the coupling 106 at the distal end 112b can receive off-axis forces (such as that induced by mechanical or current loads) that bias the thrust tube 104 away from the longitudinal axis A.

Since the bridge coupling 132 defines a substantially rigid connection between the thrust tube 104 and the guide shaft 128 at the distal end 112b, off-axis forces can bias the guide shaft 128 toward a similar orientation as the thrust tube 104. However, the guide shaft 128 is radially constrained within the guide housing 136, and formed of a rigid material selected to maintain the orientation of the guide shaft 128 alongside longitudinal axis A, and to reduce or minimize deflection of the guide shaft 128 transverse to longitudinal axis A.

As such, the guide shaft 128 and the bridge coupling 132 operate to support the thrust tube 104 at the distal end 112b, and to maintain the axial position of the thrust tube 104 by reducing transverse deflections in response to mechanical and electromechanical loading on coupling structure 106 at distal end 112b. For example, while a combination of off-axis (transverse) and axial (longitudinal) loading forces may operate to bias the distal end 112b to a deflected position, the radial constraints imposed on the thrust tube 104 and guide shaft 128 operate to counteract and reduce or mitigate deflection of thrust tube 104 at the distal end 112b, as compared to other designs without the support provided by guide shaft 128, or other suitably effective guide assembly 124.

In this manner, the bridge coupling 132 and the guide shaft 128 cooperate to provide positional stability to the distal end 112b. The guide shaft 128 helps support and radially constrain the distal end 112b via the bridge coupling 132. This increases an effective stiffness of the distal end 112b, as off-axis forces encounter both the radially constrained of the thrust tube 104 and the guide shaft 128. And in the configuration shown in FIG. 1, the guide shaft 128 helps provide positional stability to the distal end 112b while integrated parallel to and offset from the thrust tube 104, thereby facilitating a compact and adaptable system, according to the embodiments described herein.

Figure 2:
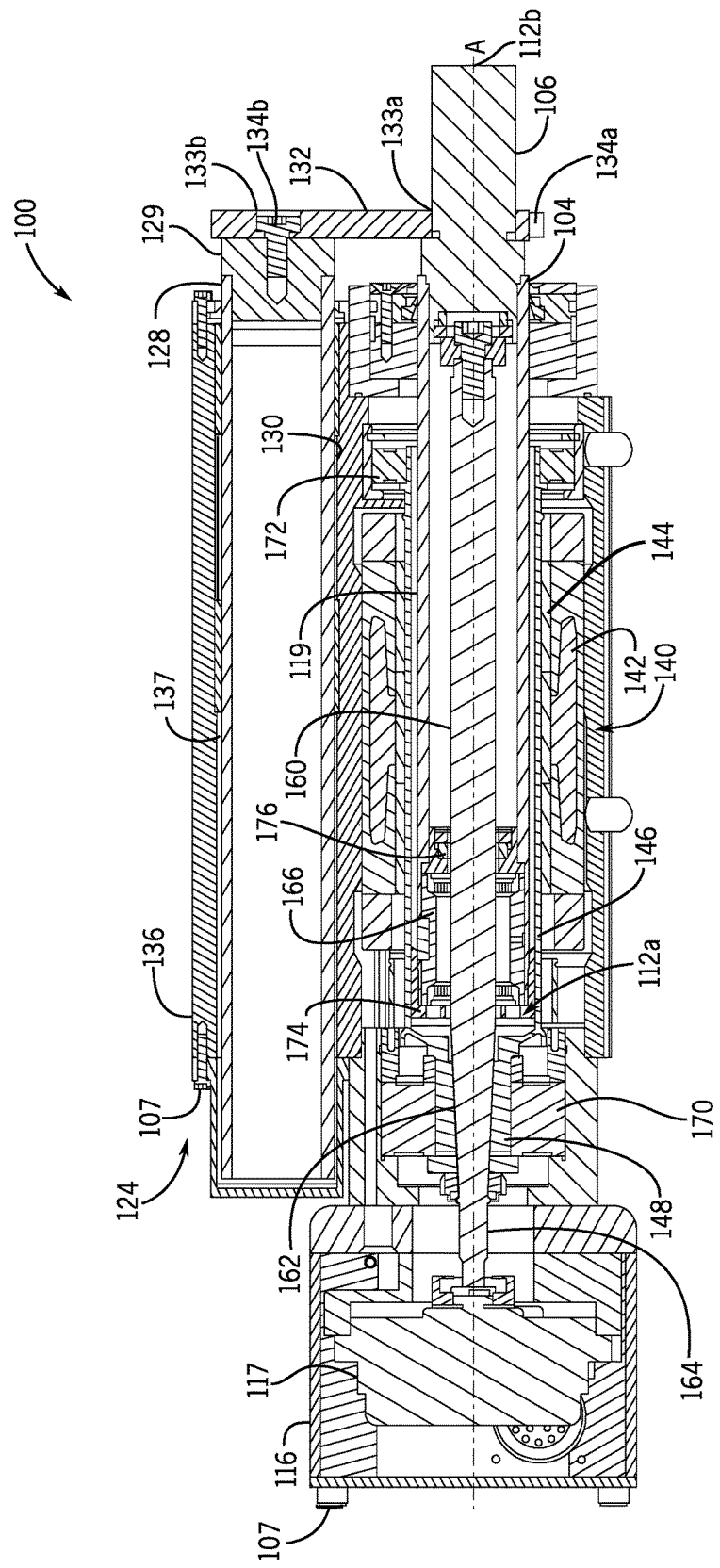
FIG. 2 is a cross-sectional view of the actuator system.

FIG. 2 is a cross-sectional view of the actuator system 100, with guide assembly 124 configured to stabilize thrust tube 104. As described herein, the guide assembly 124 includes the guide shaft 128 that is coupled to thrust tube 104 via a bridge coupling 132 proximate the distal end 112b, in order to reduce off-axis deflection as a function of welding forces and other operational loads.

In this particular configuration, linear actuator system 100 includes a motor assembly 140 within the actuator housing 108. The distal end and proximal end of the housing 108 can be coupled together by threaded rods or other mechanical couplings 107, with motor assembly 140 located inside.

Motor assembly 140 typically includes a number of motor windings 142, magnets 144 (e.g., permanent magnets or electromagnets), and a rotor 146. For example, motor assembly 140 may be configured as a hollow shaft motor having one or more stationary motor windings 142, with a centrally located, hollow rotor 146 positioned radially inwardly of windings 142, inside actuator housing 108. Conversely, windings 142 are positioned radially outwardly of rotor 146, for example, being fixed to (or fixed relative to) actuator housing 108.

When motor assembly 140 is provided in hollow shaft or hollow rotor form, as shown in FIG. 2, rotor 146 may have generally cylindrical outer and inner surfaces, with motor windings 142 and rotor 146 surrounding a centrally located linear thrust mechanism that includes a threaded shaft or lead screw 160, with nut (or thrust nut assembly) 166 coupled to the thrust tube, output rod, or other load transfer member. Alternatively, motor assembly 140 may be provided in a generally parallel configuration with respect to the thrust mechanism, for example, with a geared or belt drive. In other applications, linear actuator system 100 may be provided with a travelling screw or shaft 160 and axially fixed nut 166. In this regard, the linear actuator system 100 may use an inverted roller screw, an inverted ball screw, or other appropriate screw arrangement.

The thrust mechanism is configured to convert rotational motion of rotor 146 to linear movement of thrust tube 104. As shown in FIG. 2, for example, the thrust mechanism includes an externally threaded, elongated shaft or lead screw 160 in combination with an internally threaded nut 166, positioned radially inward of and substantially surrounded by rotor 146. In this configuration, lead screw 160 may include an externally threaded section, provided with threads along a substantial portion of the shaft length. As used herein, the terms "thread" and "threaded" may thus be used to define the main threaded section of lead screw 160, including, but not limited to, conventional threads, Acme- or ACME-type threads, roller screw threads, ball nut threads, and other threaded features suitable to convert rotational motion of rotor 146 to linear motion of thrust tube 104 and coupling 106.

Depending on design, lead screw 160 may also include a tapered section 162, for example, tapering radially inward past threaded nut 166, toward the proximal extension (or end) 164 of lead screw 160. Proximal extension 164 may be formed as an unthreaded, reduced diameter section at the proximal end of lead screw 160. Tapered section 162 extends from extension 164 through hub 148 and may be rotationally coupled thereto, for example, by providing the inner surface of hub 148 with a complementary taper, or with a lock and key arrangement.

Thrust bearing 170 can be positioned radially outward of hub 148 and configured to support hub 148 and proximal extension 164 of lead screw 160 within actuator housing 108. Depending upon design, rotor 146 and hub 148 may be provided as a single, integrated component, or as separate parts. The proximal end of rotor 146 can also be rigidly connected with the axially extending (rotor mounting portion) of hub 148, so that rotation of rotor 146 causes a corresponding rotation of hub 148 and lead screw (or screw shaft) 160.

A rotary encoder 117 or other position sensor/controller may be mounted to proximal extension 164 of lead screw 160, utilizing a direct mechanical mount. For example, a hollow shaft (incremental or absolute) encoder 117 can be coupled to lead screw 160 using a threaded connection or other mechanical means, with the rotation sensor element mounted directly onto proximal extension 164. A coupling member can also be provided between proximal extension 164 of lead screw 160 and encoder 117, for example, with a flexible mounting structure to accommodate flexing and displacement due to axial and radial forces on lead screw 160 during operation of the linear actuator system 100.

In some embodiments, the distal end of rotor 146 may be provided with a recessed portion to accommodate a bearing member 172 configured to support and stabilize the distal end of the rotor 146 relative to actuator housing 108. For example, an axially floating bearing 172 may be provided, which can float or travel in an axial direction (parallel to rotational axis A of rotor 146 and lead screw 160), in order to accommodate thermal expansion of rotor 146 and other components.

The central portion of rotor 146 can be provided with a number of magnets 144, mounted either along the outer surface of rotor 146, or inlaid within the outer surface of rotor 146, adjacent windings or coils 142. For example, rotor 146 can be machined to form axially-extending channels or grooves along the central portion of rotor 146, and magnets 144 can be inlaid within the grooves, between the corresponding (and radially thicker) axial rib sections. This also may provide rotor 146 with thicker wall sections at the proximal and distal ends, extending axially on either side of magnets 144.

An axial channel and rib structure reduces the mass and movement of inertia of rotor 146, so that less torque is required for angular acceleration and deceleration. The outer (proximal and distal) ends of rotor 146 can also be provided with a plurality of holes or apertures extending through the wall sections, in order to further reduce inertia and torque requirement. In these forms, rotor 146 also facilitates simple assembly of motor assembly 140, without requiring additional tooling for alignment, while providing sufficient material to reduce or limit core saturation due to the high flux density of magnets 144, and prevent flux leakage into the rotor core.

Threaded nut 166 is mechanically coupled to the proximal end of thrust tube 104. In one embodiment, for example, nut 166 is held in a cavity or pocket, as shown in FIG. 2, with locking end cap 174 attached to the proximal end of thrust tube 104. A cushion or impact-reducing member 176 can be provided on the distal side of nut 166, opposite end cap 174, for example in the form of an O-ring or other suitable compressible material configured to protect nut 166 from damage during power up procedures, or in the case of a runaway drive command.

When motor assembly 140 is operated, rotor 146 rotates in a first (e.g., clockwise) or second (e.g., counter-clockwise) direction about longitudinal axis A. The proximal end of rotor 146 is connected to lead screw 160 (e.g., via hub 148), so that rotation of rotor 146 results in a corresponding rotation of lead screw 160, in either the first or second direction.

Threaded nut 166 may include internal threads, for example, recirculating ball threads, which mate with external threads on the outer surface of lead screw 160 to convert rotational motion of rotor 146 to linear (axial) motion of nut 166. Nut 166 and thrust tube 104 are coupled together, and thus move in unison along the longitudinal axis A when lead screw 160 is rotated by rotor 146 of motor assembly 140.

For example, nut 166 and thrust tube 104 may move in a distal direction in response to a first (clockwise) rotation of rotor 146 and lead screw 160, extending coupling member 106 away from the actuator housing 108 along axis A of the linear actuator system 100. Conversely, when motor assembly 140 drives rotor 146 and lead screw 160 in the opposite (counter-clockwise) direction, nut 166 and thrust tube 104 move in a proximal direction along the longitudinal axis A, retracting coupling member 106 toward the actuator housing 108.

Alternatively, the threading configuration may be different, and the proximal and distal motions of thrust tube 104 may be reversed with respect to the rotation of lead screw 160. Thus, motor assembly 140 is controllable to provide any desired linear or axial motion of thrust tube 104, coupling 106, and any workpiece or tooling connected thereto, based on the rotational motion of rotor 146 and lead screw 160.

FIG. 2 also shows the guide assembly 124 positioned adjacent the longitudinal axis A, along which the thrust tube 104 is configured for reciprocating motion. The guide assembly 124 is arranged in a manner that allows the guide shaft 128 and the thrust tube 104 to be substantially parallel to one another during the reciprocating motion. In this manner, the thrust tube 104 has a longitudinal side or exterior surface 119 and the guide shaft 128 has a longitudinal side or exterior surface 130, each of which are parallel to and offset from one another. This adjacent and parallel orientation can be maintained when the thrust tube 104 is in both a first, retracted position and a second, extended position.

This configuration facilitates use of the guide shaft 128 as a position-stabilizing component for the thrust tube 104. For example, as shown in FIG. 2, a substantial portion of the guide shaft 128 is received within a passage, aperture or channel 137 defined by the guide housing 136 in the first, retracted position. Within the channel 137, the guide shaft 128 is radially constrained, such that the guide shaft 128 is prevented by the guide housing 136 from moving radially away from a center of the channel 137. In the second extended position, both the thrust tube 104 and the guide shaft 128 move along the longitudinal axis A. In the second extended position, a substantial portion of the guide shaft 128 remains within the channel 137, and is thus radially constrained. Accordingly, this configuration can maximize an amount of the guide shaft 128 that remains in the channel 137 in the second extended position, which in turn, influences an amount of positional stability the guide shaft 128 provides to the distal end 112b of the thrust tube 104.

In the configuration of FIG. 2, the guide housing 136 substantially covers or shields the guide shaft 128 when the guide shaft 128 is in the first retracted position. As such, the guide housing 136 can shield the guide shaft 128 from potential contaminants. This arrangement also allows the mass of the guide assembly 124 to be positioned substantially overlapping with the actuator housing 108, rather than being cantilevered or otherwise offset from the actuator housing 108. By positioning the guide assembly 124 in this manner, a center of gravity of the linear actuator system 100 may be closer to the proximal end 112a of the thrust tube 104. This may facilitate securing the linear actuator system 100, such as securing the linear actuator system 100 within an automated manufacturing setting.

FIG. 2 further shows the thrust tube 104 and the guide shaft 128 connected to one another via the bridge coupling 132. The bridge coupling 132 can be connected to the thrust tube 104 and the guide shaft 128 in a variety of manners in order to establish a substantially rigid connection therebetween. In the embodiment of FIG. 2, each of the thrust tube 104 and the guide shaft 128 are substantially hollow components. In this regard, the linear actuator system 100 includes a variety of illustrative components and features that facilitate establishing a substantially rigid connection between the hollow components.

In particular, FIG. 2 shows the thrust tube 104 connected with the coupling 106 at the distal end 112b. FIG. 2 further shows the guide shaft 128 connected with the fitting 129 at the distal end of the guide shaft 128. The fitting 129 at the distal end of the guide shaft 128 may be a cap or connecting piece that fits at least partially into a hollow portion of the guide shaft 128. More generally, the fitting 129 defines an interface between the guide shaft 128 and the bridge coupling 132. In the embodiment of FIG. 2, the thrust tube 104 is connected to the bridge coupling 132 via the coupling 106. Further, the guide shaft 128 is connected to the coupling 132 via the fitting 129. The connection between the bridge coupling 132 and each of the coupling 106 and the fitting 129 is shown outside of one or more housings of the linear actuator system 100 (e.g., actuator housing 108, guide housing 136); however, in other cases the bridge coupling 132 may be positioned at least partially within a housing in the first retracted position.

The bridge coupling 132 is shown in FIG. 2 as defining various openings or other structures that facilitate connecting the bridge coupling 132 to the thrust tube 104 and the guide shaft 128. For example, bridge coupling 132 may be formed as a plate or similar structure defining at least a first opening 133a in a first end (or end portion), and a second opening 133b in a second end (or end portion). The first opening 133a is used to connect the first end of the bridge coupling 132 to the end coupling 106 on distal end 112b of the thrust rod 104, and the second opening 133b is used to connect the second end of the bridge coupling 132 to the end fitting 129 on the distal end of guide shaft 128.

To illustrate, the coupling 106 on the distal (output) end 112b of the thrust rod 104 may be received by and extend substantially through the opening 133a on the second (lower) end of the bridge coupling 132. In some configurations, the bridge coupling 132 encompasses a perimeter of the thrust rod coupling 106, helping support and positionally stabilize the distal end 112b along longitudinal axis A, as described herein.

A first fastener 134a, such as a set screw, may fix a longitudinal position of the thrust tube 104 to the bridge coupling 132, thereby allowing the reciprocating movements of the thrust tube 104 to drive the bridge coupling 132 along the longitudinal axis A. With regards to the second opening 133b, a second fastener 134b extends through the second opening 133b and secures the distal end of the guide shaft 128 to the second (top) end of the bridge coupling 132. As such, the reciprocating movements of the bridge coupling 132 along the longitudinal axis A drive the fitting 129 (and connected guide shaft 128) correspondingly. Alternatively, the second (top) end of the bridge coupling 132 can be disposed in sliding engagement along a selected length of a fixed guide shaft 128, as described herein.

It will be appreciated that the linear actuator system 100 generates heat. For example, the linear actuator system 100 can generate heat caused by the movement of the thrust tube 104 along the longitudinal axis A, as well as from movement of the associated mechanical components, described above. A machine tool (e.g., machine tool 304 of FIGS. 3A and 3B) or other component connected to the coupling 106 can also generate heat, such as may be produced due to a welding or other operation performed by the tool. As shown in FIG. 2, the guide assembly 124 provides an additional mass for the linear actuator system 100. The guide assembly 124 also increases a surface area of the linear actuator system 100, for example, relative to traditional actuator systems. Accordingly, the increased mass and surface area can provide heat-dissipative properties to the linear actuator system 100.

In some cases, this can allow the linear actuator system 100 to function at a lower operational temperature, which may facilitate longevity and reliability of the system.

Figure 3A:
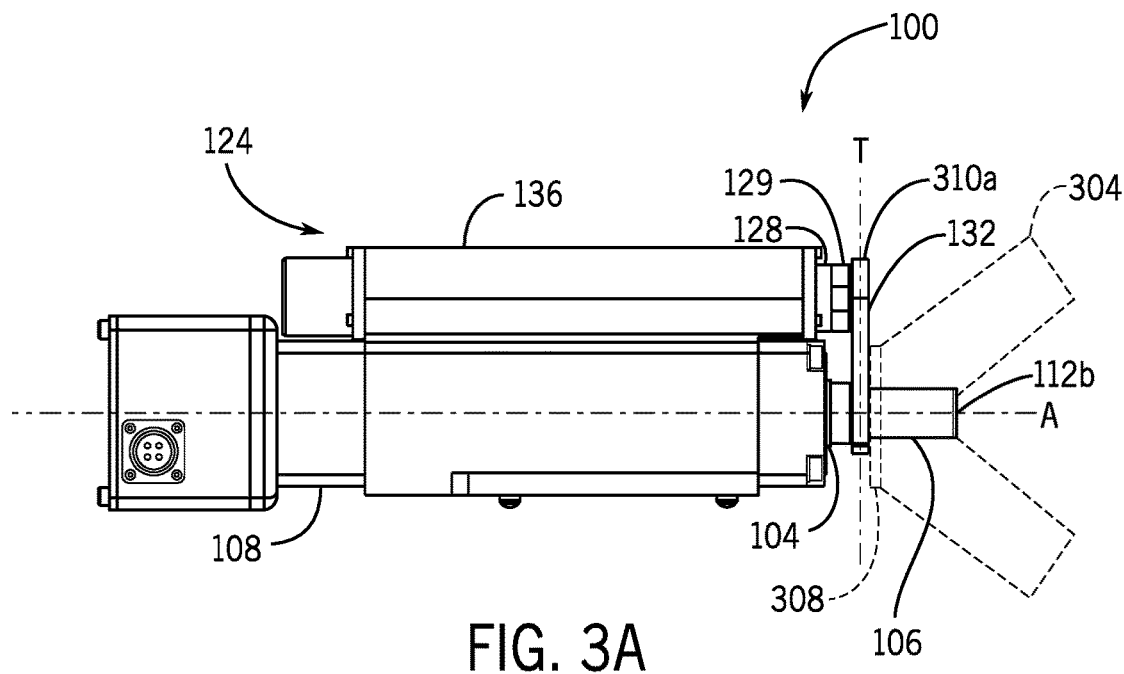
FIG. 3A is a side view of the actuator system, with the thrust tube and guide rod in a retracted position.
Figure 3B:
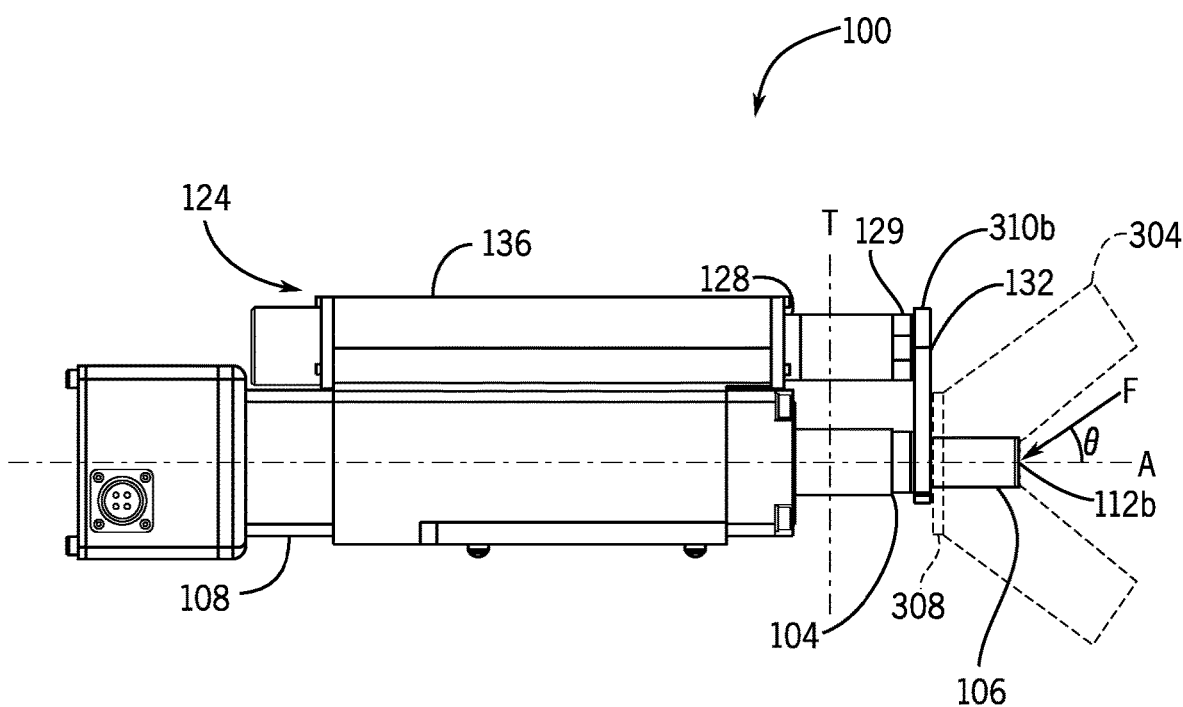
FIG. 3B is a side view of the actuator system, with the thrust tube and guide rod in an extended position.

FIGS. 3A and 3B depict the linear actuator system 100 in various states of reciprocating movement along the longitudinal axis A. As described herein, the thrust tube 104 is configured to move in reciprocating fashion along the longitudinal axis A. This movement can be used to drive a machine tool in a corresponding manner.

FIGS. 3A and 3B depict a machine tool 304 at various positions along the longitudinal axis A. The machine tool 304 (shown in phantom) can be any of a variety of machine tools that are used in a manufacturing process, such as an automated or robotic manufacturing process. Sample machine tools include welding, crimping, clamping, and other tools that are configured to manipulate a workpiece in a manufacturing setting.

The machine tool 304 is connected to linear actuator system 100 at the distal end 112b. For example, the machine tool 304 is engaged with one or more features of the coupling 106. In some cases, a bushing 308 or other interfacing feature, may facilitate engagement of the machine tool 304 and the coupling 106. In the case of a welding-type machine tools, the bushing 308 can have electrically insulative (insulating) properties, and thus help shield the linear actuator system 100 from current associated with the operations of the machine tool 304.

With reference to FIG. 3A, the linear actuator system 100 is shown in a first retracted position 310a. In the first retracted position 310a, the bridge coupling 132 is aligned substantially with a transverse plane T. The transverse plane T may be adjacent a distal end of the actuator housing 108 and substantially perpendicular to the longitudinal axis A.

With reference to FIG. 3B, the linear actuator system 100 is shown in a second extended position 310b. In the second extended position 310b, each of the thrust tube 104 and the guide shaft 128 are shown partially extended along the longitudinal axis A. As such, the bridge coupling 132 is shown offset from the transverse plane T, and the machine tool 304 is advanced corresponding along the longitudinal axis A.

At the position 310b, the machine tool 304 can perform one or more operations of a manufacturing process. For example, where the machine tool 304 is a welding-type tool, the machine tool 304 performs a welding operation, where the machine tool 304 is a clamping-type tool, the machine tool 304 may perform a clamping operation, and so on. Based at least in part on an operation of the machine tool 304, the linear actuator system 100 can receive a variety of loads and loading conditions, such as a mechanical load and/or a current load. In one example, the linear actuator system 100 can receive loads including mechanical loads of up to 2,500 lb-force and current loads of up to 50 kA; however, it will be appreciated that these are sample values, and that the loads received can vary based on a number of criteria, including the operations performed by the machine tool 304.

The machine tool 304 is connected to the linear actuator system 100 at the coupling 106. As such, loads induced by one or more operations of the machine tool 304 may generally be received at or adjacent to the coupling 106, or distal end 112b more generally. At least some component of the load (represented by force F in FIG. 3B) may act off-axis. For example, some component of the load may act at an angle Θ from the longitudinal axis A. Accordingly, the force F is shown oriented at the angle Θ from the longitudinal axis A and represents a component of the load associated with the operation of the machine tool 304 that is off-axis. The force F may bias the coupling 106 away from the longitudinal axis A. In some cases, this may cause the coupling 106 to deflect from the longitudinal axis. To the extent that the coupling 106 deflects, the machine tool 304 can move away from a target position, such as a position associated with manipulating a workpiece of a manufacturing process.

As described herein, the guide assembly 124 operates with the bridge coupling 132 to reduce and mitigate the deflection of the coupling 106. As such, the coupling 106 can receive a variety of loads (including off-axis forces) that are mitigated from deflecting the coupling 106 beyond the target position of the machine tool 304. To illustrate, as shown in FIG. 3B, in the second extended position 310b, the bridge coupling 132 and the guide shaft 128 move along the longitudinal axis A with the thrust tube 104. The bridge coupling 132 therefore provides a substantially rigid support to an otherwise cantilevered portion of the thrust tube 104. This rigid support provided by the bridge coupling 132 increases an effective stiffness of the coupling 106 at the distal end 112b. Accordingly, a greater amount of force is required to deflect the distal end 112b than would otherwise be required without the support provided by the bridge coupling 132.

The arrangement shown in FIG. 3B is configured to limit a deflection of the coupling 106, such as a movement of the coupling 106 away from the longitudinal axis A. In one example, the deflection can be limited to 2 millimeters or less. However, it will be appreciated that this is a sample value, and that the deflection of the coupling 106 may vary based on a variety of factors, including loading, stroke length, material properties, and so forth. Limiting the deflection of the coupling 106 may be in response to a load associated with an operation of the machine tool 304, such as any of the mechanical loads and/or current loads described herein.

FIG. 4 is an isometric view of the linear actuator system 100. In the isometric view of FIG. 4, the bridge coupling 132 is depicted as a plate. The plate defined by the bridge coupling 132 is positioned along a direction substantially transverse to the longitudinal axis A. In this manner, the bridge coupling 132 helps maintain a substantially parallel orientation of the guide shaft 128 and the thrust tube 104 relative to the longitudinal axis A. For example, each of the guide shaft 128 and the thrust tube 104 extend substantially perpendicular from the bridge coupling 132. The guide shaft 128 and the thrust tube 104 are substantially rigidly connected to the bridge coupling 132 via various fittings, coupling, and other features described herein, and thus the transverse positioning of the bridge coupling 132 along the longitudinal axis A helps maintain the substantially parallel configuration of the guide shaft 128 and the thrust tube 104 along the longitudinal axis A, as described herein.

FIG. 4 also shows a thickness of plate defining the bridge coupling 132. The thickness of the plate is used to define a substantially rigid connection between the thrust tube 104 and the guide shaft 128. For example, the coupling 106 is shown extending through a thickness of the plate at the opening 133a. Further, the second fastener 134b is shown extending through a thickness of the plate the opening 133b (e.g., for attachment to the fitting 129). The structural encompassing of the features associated with the thrust tube 104 and the guide shaft 128 help strengthen a rigidity between the thrust tube 104 and the guide shaft 128, thereby helping limit deflection at the distal end 112b.

One or more housing components of assemblies of the linear actuator system 100 may be secured to an external support structure. The external support structure may be a rigid support in a manufacturing setting. Additionally or alternatively, the external support structure may be a component of a robotic-type assembly.

In the embodiment of FIG. 4, the linear actuator system 100 includes a ledge 109 having through portions 110. The ledge 109 is shown positioned substantially along a base of the linear actuator system 100, such as being a part of the actuator housing 108. However, in other cases, the ledge 109 can be positioned in other locations in the linear actuator system 100 in order to facilitate securement to an appropriate support structure. The through portions 110 may be configured to receive bolts, rivets, fasteners, or other appropriate structures that may secure the ledge 109 to the support structure. The through portion 110 may thus allow the linear actuator system 100 to be installed and removed from different support structures as needed, such as allowing for subsequent reuse of the linear actuator system 100 in another manufacturing process. In other cases, the ledge 109 may be used as a welding interface at which the linear actuator may be welded or bonded to the support structure in the manufacturing setting.

FIG. 5A shows a front view of the linear actuator system 100. In the front view of FIG. 5A, the bridge coupling 132 is shown between components associated with the thrust tube 104 and the guide shaft 128. For example, the coupling 106 is shown extending through the first opening 133a. As described herein, the coupling 106 is connected to and aligned with the thrust tube 104 along the longitudinal axis A. The coupling 106 is seated within the first opening 133a and secured therein by the first fastener 134a. FIG. 5A shows the first fastener 134a as a set screw offset from the coupling 106. The fastener 134a can be tightened in order to reduce a circumference of the first opening 133a, thereby helping to fix a position of the coupling 106 relative to the bridge coupling 132.

Further, the second fastener 134b is shown positioned within the second opening 133b. As described herein, the second fastener 134b is connected to and aligned with the guide shaft 128 adjacent the longitudinal axis A. The second fastener 134b can be tightened relative to a normal face of the bridge coupling 132 and thus allow the guide shaft 128 to move with the movements of the bridge coupling 132.

As shown in FIG. 5A, not only is the bridge coupling 132 positioned between components associated with the thrust tube 104 and the guide shaft 128, the bridge coupling also encompasses and extends beyond such components. For example, the bridge coupling 132 includes a first end region 508a. The first end region 508a extends beyond the coupling 106 opposite the second fastener 134b. The bridge coupling 132 further includes a second end region 508b. The second end region 508b extends beyond the second fastener 134b opposite the coupling 106. The first end region 508a and the second end region 508b may enhance the stiffness of the bridge coupling 132. For example, by extending the material of the bridge coupling 132 beyond the longitudinal axis A and the axis of the guide shaft 128, the bridge coupling 132 may be more resistant to deformations caused by the axial movements of the thrust tube 104 and the guide shaft 128, and as such, help maintain a substantially parallel orientation of the thrust tube 104 and the guide shaft 128 during reciprocating movements along the respective axes.

In this regard, the longitudinal axis A and an axis of the guide shaft 128 are shown separated by an offset distance 504. The bridge coupling 132, according to the embodiments described herein, helps maintain the offset distance 504 outside of the various housing components of the linear actuator system 100. And in particular, the bridge coupling 132 helps maintain the offset distance 504 during the reciprocating movements of the thrust tube 104.

FIG. 5A also shows the linear actuator system 100 having a first connector 120a and a second connector 120b. Each of the first connector 120a and the second connector 120b may be substantially analogous to the connector 120 described about in relation to FIG. 1. For example, one or both of the first connector 120a and the second connector 120b can be used to connect the linear actuator system 100 to a power supply, remote computing unit, and/or other external system or process. Each of the first connector 120a and the second connector 120b can be configured to connect the linear actuator system 100 to distinct systems. For example, the first connector 120a may be configured to connect the linear actuator system 100 to a power supply and the second connector 120b may be configured to connect the linear actuator system 100 to a remote computing unit. In other cases, more or fewer connectors may be provided, as may be appropriate for a given application.

FIG. 5B is a rear view of the linear actuator system 100. In the rear view of FIG. 5, the control housing 116 is shown. The first connector 120a is positioned on a first side of the control housing 116 and the second connector 120b is positioned on a second side of the control housing 116. A rear view of the guide assembly 124 is also shown, which housing the guide shaft, as described herein.

Figure 6A:
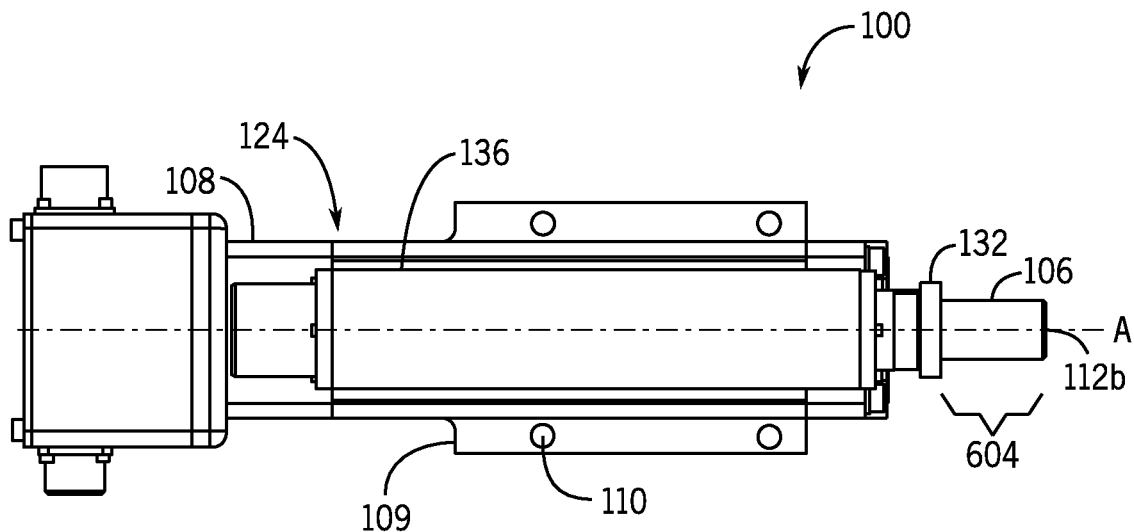
FIG. 6A is a top of the actuator system, showing the guide rod assembly coupled to the actuator housing.

FIG. 6A is a top view of the linear actuator system 100. The top view of FIG. 6A shows the guide assembly 124 connected to the actuator housing 108. FIG. 6 also illustrates a cantilevered portion 604 of the coupling 106. The cantilevered portion 604 is a section of the coupling 106 that extends along the longitudinal axis beyond the bridge coupling 132. The cantilevered portion 604 may be configured for engagement with a machine tool (e.g., the machine tool 304 of FIGS. 3A and 3B). For example, the cantilevered portion 604 may have a length, width, and/or other dimension or contour that is configured to match a corresponding dimension of an appropriate machine tool. The cantilevered portion 604 also may define a section of the coupling 106 having various engagement structures, such as a grooves, clips, fasteners, and so on that are used to secure a machine tool to the coupling 106.

Figure 6B:
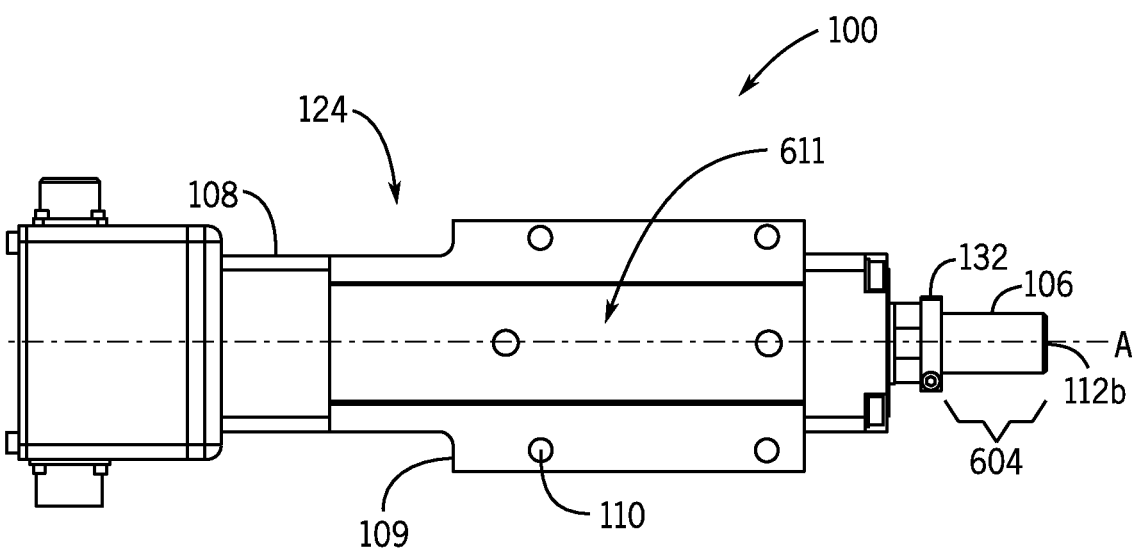
FIG. 6B is a bottom view of the actuator system, showing a representative mounting footprint and coupling points.

FIG. 6B is a bottom view of the linear actuator system 100. The bottom view of FIG. 6B shows a representative mounting footprint. The mounting footprint may be generally defined by an underside 611 of the linear actuator system 100 as shown in FIG. 6B. The underside 611 may generally be a flat or planar portion of one or more of the housing components 108 of the linear actuator system 100. In other cases, the underside 611 may define various contoured surfaces that define the footprint; e.g., in the embodiment of FIG. 4, where the linear actuator system 100 includes a ledge 109 having through portions 110, and the ledge 109 is shown positioned substantially along a base of the linear actuator system 100, such as being a part of the actuator housing 108. The footprint of the linear actuator system 100 also generally encompasses a center of gravity of the system. For example, the center of gravity of the linear actuator system 100 may be within the footprint, where the thrust tube 104 is in the first retracted position or the second extend position, defined at the respective limits of the reciprocating motion.

About a perimeter of the underside, FIG. 6B shows various coupling points that are used to secure the linear actuator system 100 to a support structure. In particular, FIG. 6B shows ledges 109 along the perimeter of the actuator housing 108. The ledges 109 have through portions 110 that are configured to receive fasteners and the like. Such fasteners may be positionable through the through portion 110 and used to restrict movement of the linear actuator system relative to the support structure or other component receiving the respective fasteners.

Figure 7:
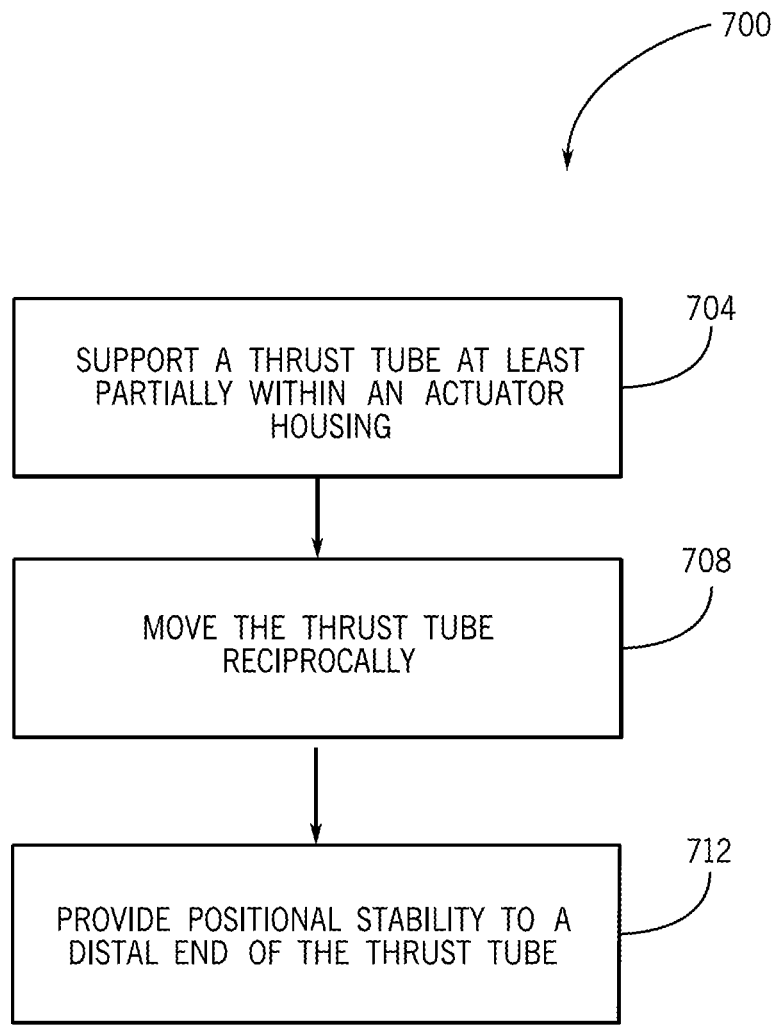
FIG. 7 is a flow diagram for stabilizing a thrust tube of an actuator.

To facilitate the reader's understanding of the various functionalities of the embodiments discussed herein, reference is now made to the flow diagram in FIG. 7, which illustrates process 700. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 7, process 700 relates generally to a method for stabilizing a thrust tube of a linear actuator. The process 700 may be used with the linear actuator system 100 described herein.

At operation 704, a thrust tube is at least partially support within an actuator housing. For example and with reference to FIG. 2, the thrust tube 104 is at least partially supported within the actuator housing 108. The thrust tube 104 extends generally from the proximal end 112a to the distal end 112b. The proximal end of the thrust tube 104 is within the actuator housing 108 and the distal end 112b of the thrust tube is outside of the actuator housing 108. The distal end 112b is generally selectively positionable outside of the actuator housing 108, according to the embodiments described herein.

At operation 708, the thrust tube is moved in reciprocating fashion. For example and with reference to FIGS. 3A and 3B, the thrust tube 104 is moved to reciprocate between the first retracted position 310a and the second extended position 310b. In the second extended position 310b, the distal end 112b is subject to loading. For example, the machine tool 304 is connected to the coupling 106 of the linear actuator system 100 at the distal end 112b. One or more operations of the machine tool 304 may induce a force F that operates at an angle θ to the longitudinal axis A.

At operation 712, positional stability is provided to a distal end of the thrust tube 104. For example and with reference to FIGS. 3A and 3B, the guide assembly 124 and the bridge coupling 132 cooperate to support the coupling 106 along the longitudinal axis A. In particular, the guide assembly 124 includes the guide shaft 128. The guide shaft 128 is a moveable component that moves with the reciprocating movements of the thrust tube 104. For example, the bridge coupling defines a substantially rigid connection between the guide shaft 128 and the thrust tube 104. This allows the bridge coupling 132 to move the guide shaft 128 with the reciprocating movements of the thrust tube. The guide shaft 128 is radially constrained within the guide assembly 124 (e.g., by the guide housing 136), and as such, the rigid connection between the guide shaft 128 and the thrust tube 104 help enhance a radially stiffness of the coupling 106 at the distal end 112b.

EXAMPLES

Systems devices and techniques related to linear actuators are disclosed herein. A linear actuator generally includes a thrust tube configured for reciprocating motion along a longitudinal axis. A distal end of the thrust tube is configured to engage a machine tool, such as a welding, crimping, clamping, or other tool, thereby allowing the linear actuator to drive the machine tool in reciprocating motion with the thrust tube. This can facilitate use of the linear actuator in an automated assembly or manufacturing setting. The distal end is subjected to loading, including mechanical and current loading, that impacts positioning of the thrust tube.

As described herein, a guide assembly can be incorporated with a linear actuator and help guide the reciprocating motion of the thrust tube. In some cases, this involves limiting deflection of the distal end, which is subjected to off-axis forces from mechanical and current loads. While it will be appreciated that a variety of examples and implementations are within the scope and spirit of the disclosure and appended claims, a number of examples and refinements are described below for purposes of illustration. Thus, the examples are not targeted to be exhaustive or to limit the disclosure to the precise forms disclosed, and it will be apparent to one of ordinary skill in the art that many modifications and variations are possible in view of the above teachings.

Example 1

As a first example, a linear actuator system is disclosed. The linear actuator includes an actuator housing. The linear actuator further includes a thrust tube extending from a proximal end disposed at least partially within the actuator housing to a distal end disposed at least partially outside the housing. The linear actuator further includes a motor configured to move the thrust tube reciprocating motion along a longitudinal axis thereof. The linear actuator further includes a guide assembly connected to the actuator housing. The guide assembly includes a guide shaft configured for coordinated reciprocating motion with the thrust tube, adjacent the longitudinal axis. The linear actuator includes a bridge coupling between the guide shaft and the thrust tube. The guide shaft and bridge coupling are configured to provide positional stability to the distal end of the thrust tube, in the reciprocating motion along the longitudinal axis.

A number of feature refinements and additional features are applicable in the first example and contemplated in light of the present disclosure. These feature refinements and additional features may be used individually or in any combination. As such, each of the following features that will be discussed may be, but are not required to be, used with any other feature combination of the first example.

To illustrate, in an embodiment, the guide assembly further includes a guide housing coupled to the actuator housing. The guide shaft is disposed at least partially within the guide housing, parallel to the thrust tube. The guide shaft extends from a first end positioned within the guide housing to a second end positioned outside the guide housing. The first end and second ends are spaced laterally adjacent to the proximal and distal ends of the thrust tube, respectively. The bridge coupling is disposed outside the actuator housing and the guide housing. In particular, the bridge coupling extends transversely to the longitudinal axis from a first portion coupled to the distal end of the thrust tube to a second portion coupled to the second end of the guide shaft.

In another embodiment, the guide shaft and bridge coupling are adapted to limit deflection of thrust tube transverse to the longitudinal axis in response to mechanical or electromechanical loading on the distal end of the thrust tube, or both. In operation, the thrust tube reciprocates between a first retracted position and a second extended position and the guide shaft and the bridge coupling limit transverse deflection of the distal end of the thrust tube in the second position to within a selected limit, when subject to the loading, such as being subjected to any of the mechanical loads and/or current loads described herein. The distal end of the thrust tube is therefore subject to an off-axis force that acts to deflect the distal end of the thrust tube transverse to the longitudinal axis in response to one or both of mechanical and electromechanical loading on the distal end.

In another embodiment, the linear actuator system further includes an electrode assembly coupled with the thrust tube at the distal end. The electrode assembly includes a resistive bushing coupled to the distal end of the thrust tube and a weld electrode coupled to the resistive bushing. The weld electrode is electrically isolated from the thrust tube.

Example 2

As a second example, a method is disclosed. The method is directed to stabilizing a thrust tube. The method includes supporting a thrust tube at least partially within an actuator housing. The thrust tube extends from a proximal end within the actuator housing to a distal end selectively positionable exterior to the actuator housing. The method further includes moving the thrust tube between a first retracted position with the distal end proximate the actuator housing and a second extended position with the distal end spaced from the actuator housing. The distal end of the thrust tube is subject to loading in the second extended position. The method further includes providing positional stability to the distal end of the thrust tube when subject to the loading with a guide assembly positioned adjacent the thrust tube. The guide assembly includes a guide shaft moveable with the thrust tube and a bridge coupling between the guide shaft and the distal end of the thrust tube.

A number of feature refinements and additional features are applicable in the second example and contemplated in light of the present disclosure. These feature refinements and additional features may be used individually or in any combination. As such, each of the following features that will be discussed may be, but are not required to be, used with any other feature combination of the second example.

To illustrate, in an embodiment, the loading includes one or both of a mechanical load induced on the distal end of the thrust tube by operation of a machine tool or a current load induced in an electrode coupled to the distal end of the thrust tube. The method further includes limiting transverse displacement of the distal end of the thrust tube with respect to a longitudinal axis thereof. An off-axis force is induced on the distal end responsive to one or both of the mechanical and current load. The method further includes providing positional stability to the thrust tube comprises limiting off-axis deflection of the distal end when subject to the loading in the second extended position.

In another embodiment, the method further includes slidingly engaging the guide shaft within a guide housing coupled to the actuator housing. The guide housing is configured to constrain off-axis deflection of the guide shaft when moving with the thrust tube. The method further includes coupling the bridge coupling with a distal end of the guide shaft, exterior to the guide housing.

Example 3

As a third example, an apparatus is disclosed. The apparatus includes features directed to stabilizing an actuator thrust tube. The apparatus includes an actuator having a thrust tube configured for reciprocating motion along a longitudinal axis. The thrust tube has a distal end configured for coupling to a machine tool. The apparatus further includes a guide shaft disposed offset from the longitudinal axis and oriented substantially parallel to the thrust tube. The apparatus further includes a bridge coupling between the thrust tube and the guide shaft at the distal end. The bridge coupling is configured to move the guide shaft with the reciprocating motion of the thrust tube. The bridge coupling and the guide shaft cooperate to limit off-axis deflection of the distal end of the thrust tube, during the reciprocating motion.

A number of feature refinements and additional features are applicable in the third example and contemplated in light of the present disclosure. These feature refinements and additional features may be used individually or in any combination. As such, each of the following features that will be discussed may be, but are not required to be, used with any other feature combination of the third example.

To illustrate, in an embodiment, the off-axis deflection is limited in a direction transverse to the guide shaft and the thrust tube, in a common plane thereof. The bridge coupling includes a plate positioned along the transverse direction. In some cases, the plate is configured to receive one or both of the thrust tube or the guide shaft.

In another embodiment, the thrust tube reciprocates between a first retracted position and a second extended position. The bridge coupling is configured to maintain a stiffness of the thrust tube between the first retracted position and the second extended position.

In another embodiment, the apparatus further includes an actuator housing receiving at least a portion of the thrust tube. The apparatus further includes a guide housing receiving at least a portion of the guide shaft. The actuator housing and the guide housing constrain off-axis deflection of the thrust tube and guide shaft, respectively, with the reciprocating movement of the thrust tube. In some cases, the apparatus includes a bushing adapted for sliding engagement of the guide shaft within the guide housing. The bushing is adapted to prevent entry of containments associated with an operation of the machine tool. The apparatus has a center of gravity within a footprint of the actuator, with the thrust tube in one or both of a retracted position and an extended position defined at respective limits of the reciprocating motion.

In another embodiment, the apparatus further includes the machine tool. The machine tool is connected to the distal end of the thrust tube. The machine tool is configured to exert a mechanical force independent from an operation of the actuator. In some cases, the machine tool is a clamping mechanism.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

The invention claimed is:
1. A linear actuator system comprising:
   an actuator housing;
   a thrust tube extending from a proximal end disposed at least partially within the actuator housing to a distal end disposed at least partially outside the housing;

a motor configured to move the thrust tube in reciprocating motion along a longitudinal axis thereof;

a guide assembly coupled to the actuator housing, the guide assembly comprising a guide shaft configured for coordinated reciprocating motion with the thrust tube from a first retracted position to a second extended position, adjacent the longitudinal axis, and a guide housing coupled with the actuator housing, with the guide shaft disposed at least partially within the guide housing, parallel to the thrust tube; and a coupling between the guide shaft and the thrust tube, wherein the guide shaft and coupling are configured to provide positional stability to the distal end of the thrust tube, in the reciprocating motion along the longitudinal axis;

wherein the guide shaft extends from a first end positioned within the guide housing to a second end positioned outside the guide housing, and wherein the guide housing substantially covers the guide shaft in the first retracted position;

a coupling structure connected to the thrust tube at or adjacent the distal end and having a section that extends along the longitudinal axis beyond the coupling between the guide shaft and the thrust tube, wherein the coupling structure defines an interface configured to engage a machine tool; and an electrode assembly coupled with the thrust tube at the distal end, the electrode assembly comprising a resistive bushing coupled to the distal end of the thrust tube and a weld electrode coupled to the resistive bushing, wherein the weld electrode is electrically isolated from the thrust tube.

2. The linear actuator system of claim 1, wherein the guide housing is configured to shield the guide shaft from potential contaminants, with the guide shaft disposed at least partially within the guide housing, parallel to the thrust tube.

3. The linear actuator system of claim 2, wherein the guide housing and actuator housing comprise an integral or co-extruded housing component defining one or more apertures adapted for accommodating the motor, thrust tube and guide assembly.

4. The linear actuator system of claim 2, wherein the guide housing and actuator housing comprise two or more separate housing structures coupled together by welding or mechanical attachment.

5. The linear actuator system of claim 2, wherein the first end and second end of the guide shaft are spaced laterally adjacent the proximal and distal ends of the thrust tube, respectively.

6. The linear actuator system of claim 5, wherein the coupling comprises a bridge or plate structure disposed outside the actuator housing and the guide housing, extending transversely to the longitudinal axis from a first portion fixed to the distal end of the thrust tube to a second portion fixed to the second end of the guide shaft.

7. The linear actuator system of claim 1, wherein the guide shaft and coupling are adapted to limit deflection of the thrust tube transverse to the longitudinal axis in response to mechanical or electromechanical loading on the distal end of the thrust tube, or both.

8. The linear actuator system of claim 7, wherein the thrust tube reciprocates between a first retracted position and a second extended position, and the guide shaft and the coupling limit transverse deflection of the distal end of the thrust tube in the second extended position to within a selected limit, when subject to the loading.

9. The linear actuator system of claim 7, wherein the loading comprises a mechanical force directed substantially along the longitudinal axis responsive to positioning the thrust tube in the second extended position, and an electromechanical force induced by a current induced in an electrode coupled to the distal end of the thrust tube.

10. The linear actuator system of claim 9, wherein the distal end of the thrust tube is subject to an off-axis force that acts to deflect the distal end of the thrust tube transverse to the longitudinal axis in response to one or both of mechanical loading or electromechanical loading on the distal end.

11. A method comprising:

supporting a thrust tube at least partially within an actuator housing, wherein the thrust tube extends from a proximal end within the actuator housing to a distal end selectively positionable exterior to the actuator housing;

moving the thrust tube between a first retracted position with the distal end proximate the actuator housing and a second extended position with the distal end spaced from the actuator housing, wherein the distal end of the thrust tube is subject to loading in the second extended position; and providing positional stability to the distal end of the thrust tube when subject to the loading with a guide assembly positioned adjacent the thrust tube, wherein the guide assembly includes:

a guide shaft moveable with the thrust tube from the first retracted position to the second extended position, and a guide housing coupled with the actuator housing, with the guide shaft disposed at least partially within the guide housing, parallel to the thrust tube, wherein the guide shaft extends from a first end positioned within the guide housing to a second end positioned outside the guide housing with the guide housing substantially covering the guide shaft in the first retracted position, a coupling extending between the guide shaft and the distal end of the thrust tube, wherein the guide shaft and coupling are configured to provide positional stability to the distal end of the thrust tube in the second extended position, subject to the loading; and a coupling structure connected to the thrust tube at or adjacent the distal end and having a section that extends along the longitudinal axis beyond the coupling between the guide shaft and the distal end of the thrust tube, wherein the coupling structure defines an interface configured to engage a machine tool, wherein the interface comprises an end effector and the loading comprises one or both of:

a mechanical load induced on the distal end of the thrust tube by operation of the machine tool engaged with the end effector; or a reactive force induced by a current load in an electrode coupled to the end effector at the distal end of the thrust tube.

12. The method of claim 11, further comprising limiting transverse displacement of the distal end of the thrust tube with respect to a longitudinal axis thereof, wherein an off-axis force is induced on the distal end responsive to one or both of the mechanical and current load.

13. The method of claim 12, wherein providing positional stability to the thrust tube comprises limiting off-axis deflection of the distal end when subject to the loading in the second extended position.

14. The method of claim 11, further comprising engaging the guide shaft within a guide housing coupled to the actuator housing, the guide housing configured to constrain off-axis deflection of the guide shaft when moving with the thrust tube.

15. The method of claim 14, wherein the coupling comprises a bridge or plate structure and further comprising coupling the bridge or plate structure with a distal end of the guide shaft, exterior to the guide housing.

16. An apparatus comprising:
an actuator having an actuator housing, a thrust tube, and a rotor, wherein the thrust tube is configured for reciprocating motion along a longitudinal axis of the actuator housing, the thrust tube having a distal end configured for coupling to a machine tool, wherein the rotor is located in the actuator housing and is coaxial with and positioned radially outward of the thrust tube;
a guide shaft disposed over the thrust tube, offset from the longitudinal axis and oriented substantially parallel to the thrust tube, opposite an underside of the actuator housing; and
a coupling between the thrust tube and the guide shaft at the distal end, the coupling configured to move the guide shaft with the reciprocating motion of the thrust tube;
wherein the coupling and the guide shaft cooperate to limit off-axis deflection of the distal end of the thrust tube, during the reciprocating motion; and
wherein the apparatus has a center of gravity within a footprint of the actuator defined by the underside of the actuator housing, with the thrust tube in one or both of a retracted position and an extended position defined at respective limits of the reciprocating motion; and
a coupling structure connected to the thrust tube at or adjacent the distal end and having a section that extends along the longitudinal axis beyond the coupling between the guide shaft and the thrust tube, wherein the coupling structure defines an interface configured to engage the machine tool, wherein the interface comprises an end effector or further comprising an electrode assembly coupled with the thrust tube at the distal end, wherein the off-axis deflection is responsive to exertion of a mechanical force by the machine tool on a workpiece, or a reaction force on the electrode assembly.

17. The apparatus of claim 16, wherein the off-axis deflection is limited in a direction transverse to the guide shaft and the thrust tube, in a common plane thereof.

18. The apparatus of claim 16, wherein the coupling comprises a bridge or plate structure positioned along the transverse direction, the bridge or plate structure configured to receive one or both of the thrust tube or the guide shaft at a respective distal end thereof.

19. The apparatus of claim 16, wherein the coupling is configured to maintain a position of the distal end of the thrust tube along the longitudinal axis during reciprocation motion between a first retracted position and a second extended position thereof.

20. The apparatus of claim 16, wherein the actuator housing and the guide housing constrain off-axis deflection of the thrust tube and guide shaft, respectively, during the reciprocating motion.

21. The apparatus of claim 16, further comprising a bushing adapted for sliding engagement of the guide shaft within the guide housing, the bushing adapted to prevent entry of contaminants associated with an operation of the machine tool.

22. The apparatus of claim 16, wherein the center of gravity is closer to the proximal end of the thrust tube than the distal end of the thrust tube within the footprint of the actuator, with the thrust tube in one or both of the retracted position and the extended position defined at the respective limits of the reciprocating motion.

23. The linear actuator system of claim 1, wherein the interface comprises an end effector, or one or more pins, clamps, screws, grooves, locking mechanisms or engagement features adapted to secure a machine tool to the coupling structure, or a weld electrode to the distal end of the thrust tube.

24. A linear actuator system, comprising:
an actuator housing;
a thrust tube extending from a proximal end disposed at least partially within the actuator housing to a distal end disposed at least partially outside the housing;
a motor configured to move the thrust tube in reciprocating motion along a longitudinal axis thereof;
a guide assembly coupled to the actuator housing, the guide assembly comprising a guide shaft configured for coordinated reciprocating motion with the thrust tube from a first retracted position to a second extended position, adjacent the longitudinal axis, and a guide housing coupled with the actuator housing, with the guide shaft disposed at least partially within the guide housing, parallel to the thrust tube; and
a coupling between the guide shaft and the thrust tube, wherein the guide shaft and coupling are configured to provide positional stability to the distal end of the thrust tube, in the reciprocating motion along the longitudinal axis;
wherein the guide shaft extends from a first end positioned within the guide housing to a second end positioned outside the guide housing, and wherein the guide housing substantially covers the guide shaft in the first retracted position;
a coupling structure connected to the thrust tube at or adjacent the distal end and having a section that extends along the longitudinal axis beyond the coupling between the guide shaft and the thrust tube, wherein the coupling structure defines an interface configured to engage a machine tool; and
a rotor positioned within the actuator housing, wherein the rotor is coaxial with and positioned radially outward of and at least partially longitudinally overlapping with the thrust tube.

25. A method, comprising:
supporting a thrust tube at least partially within an actuator housing, wherein the thrust tube extends from a proximal end within the actuator housing to a distal end selectively positionable exterior to the actuator housing;
moving the thrust tube between a first retracted position with the distal end proximate the actuator housing and a second extended position with the distal end spaced from the actuator housing, wherein the distal end of the thrust tube is subject to loading in the second extended position; and
providing positional stability to the distal end of the thrust tube when subject to the loading with a guide assembly positioned adjacent the thrust tube, wherein the guide assembly includes:
a guide shaft moveable with the thrust tube from the first retracted position to the second extended position, and a guide housing coupled with the actuator housing, with the guide shaft disposed at least partially within the guide housing, parallel to the thrust tube, wherein the guide shaft extends from a first end positioned within the guide housing to a second end positioned outside the guide housing with the guide housing substantially covering the guide shaft in the first retracted position, a coupling extending between the guide shaft and the distal end of the thrust tube, wherein the guide shaft and coupling are configured to provide positional stability to the distal end of the thrust tube in the second extended position, subject to the loading;

a coupling structure connected to the thrust tube at or adjacent the distal end and having a section that extends along the longitudinal axis beyond the coupling between the guide shaft and the distal end of the thrust tube, wherein the coupling structure defines an interface configured to engage a machine tool; and positioning a rotor within the actuator housing, wherein the rotor is coaxial with and positioned radially outward of and at least partially longitudinally overlapping with the thrust tube.

* * * * *